United States Patent [19]

Inata et al.

[11] 4,107,143

[45] Aug. 15, 1978

[54] AROMATIC POLYESTER CARBONATE AND METHOD FOR PRODUCING THE SAME

[75] Inventors: Hiroo Inata; Tsuto Morinaga, both of Hino; Takatoshi Kuratsuji, Matsuyama; Takanori Urasaki; Shoji Kawase, both of Iwakuni, all of Japan

[73] Assignees: Teijin Limited, Osaka, Japan; Teyin Limited, Osaka, Japan

[21] Appl. No.: 765,333

[22] Filed: Feb. 3, 1977

[30] Foreign Application Priority Data

Feb. 12, 1976 [JP] Japan ............................... 51-13257
Feb. 13, 1976 [JP] Japan ............................... 51-13905
Mar. 1, 1976 [JP] Japan ............................... 51-21078
Sep. 3, 1976 [JP] Japan ............................... 51-104918

[51] Int. Cl.$^2$ ............................................. C08G 63/62
[52] U.S. Cl. ............................................. 528/176; 260/860; 528/193; 528/196; 528/206; 528/193; 528/196; 528/206
[58] Field of Search ............... 260/47 XA, 78.3 R, 860

[56] References Cited

U.S. PATENT DOCUMENTS

| | | | |
|---|---|---|---|
| 3,169,121 | 2/1965 | Goldberg | 260/47 XA |
| 3,553,167 | 1/1971 | Schnell et al. | 260/47 XA |
| 3,637,595 | 1/1972 | Cottis | 260/47 C |
| 3,972,852 | 8/1976 | Inata et al. | 260/47 C |

*Primary Examiner*—Theodore E. Pertilla
*Attorney, Agent, or Firm*—Sughrue, Rothwell, Mion, Zinn and Macpeak; Sughrue, Rothwell, Mion, Zinn and Macpeak

[57] ABSTRACT

The present invention provides a substantially linear aromatic polyester carbonate consisting essentially of hydroxybenzoic acid unit, hydroquinone unit, and carbonate unit as well as, depending on the circumstances, aromatic carboxylic acid unit, and having an inherent viscosity of at least 0.5. The present invention also provides an industrially advantageous method for producing such linear aromatic polyester carbonate through the process steps of melt-polycondensation, and, if necessary, followed by a further polycondensation in solid phase.

Such aromatic polyester carbonate which the present invention provides exhibits excellent melt-forming property and melt anisotropy, hence any shaped article obtained by melt-forming of this aromatic polyester carbonate exhibits superior mechanical properties, in particular, excellent Young's modulus of longitudinal elasticity, and so on, which is highly useful as the material for industrial applications. The present invention also provides shaped articles in fiber and film forms having such excellent Young's modulus of longitudinal elasticity as produced from the abovementioned aromatic polyester carbonate.

14 Claims, No Drawings

AROMATIC POLYESTER CARBONATE AND METHOD FOR PRODUCING THE SAME

The present invention is concerned with aromatic polyester carbonate and a method for producing the same. It also relates to shaped articles in fiber and film forms made of such aromatic polyester carbonate. More specifically, the present invention relates to oxybenzoyl copolyester carbonate having a good shaping property which facilitates production of fibers and films of high modulus of elasticity; an industrially advantageous method for producing such oxybenzoyl copolyester carbonate; and shaped articles, particularly, fibers and films, shaped from such polymer material.

Oxybenzoyl copolyester has already been known from, for example, U.S. Pat. No. 3,637,595. This oxybenzoyl copolyester consists of hydroxybenzoyl unit, benzene carboxylic acid unit, and aromatic dihydroxy unit represented by the following general formula:

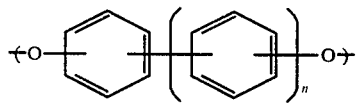

(where $n$ is 0 or 1).

This type of oxybenzoyl copolyester, however, exhibits its softening point of approximately 430° C and higher, when terephthalic acid — a representative component of the benzene dicarboxylic acid unit — is used in its production, on account of which a very high temperature is required for shaping the material into fiber, film, and other desired configurations by melting, hence difficulty is encountered not infrequently in the shaping operation, or and undesirable effect is caused, in some cases, on the quality of the resultant shaped articles. On the other hand, when isophthalic acid is used in place of terephthalic acid component, the softening point of the resulted hydroxybenzoyl copolyester lowers to a level of 255° C, on account of which the abovementioned difficulty in the shaping operation can be alleviated, although there arise other problems such that the Young's modulus of elasticity of the shaped article such as fibers and films, etc. becomes insufficient for practical purposes, and others.

In view of the abovementioned disadvantages inherent in the known type of oxybenzoyl copolyester, it is an object of the present invention to provide a new type of oxybenzoyl copolyester carbonate which has good shaping property and a high Young's modulus of elasticity capable of rendering the polymer material into shaped articles of desired form having satisfactory physical properties.

It is another object of the present invention to provide fibers and films having high Young's modulus of elasticity as shaped from such oxybenzoyl copolyester carbonate.

It is still another object of the present invention to provide an industrially advantageous method for producing such oxybenzoyl copolyester carbonate.

According to the present invention, generally speaking, there is provided aromatic polyester carbonate in a substantially linear structure having an inherent viscosity of 0.5 and above, and consisting essentially of bonding units to be represented by the following general formula:

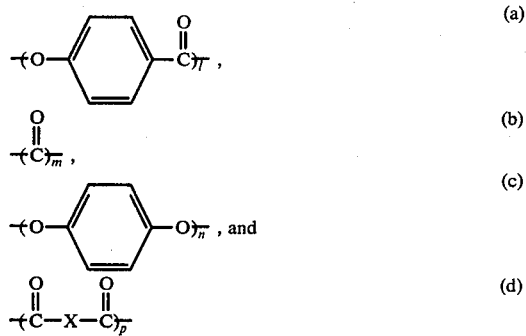

(where: X is a divalent aromatic group; the group

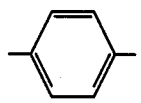

and —X— in the above-described general formulas (a), (c), and (d) are substantially bonded together by the ester bonding and the carbonate bonding; and $l$, $m$, $n$, and $p$ are in the following relatioship: $0.8 \geq l/(l + m + p) \geq 0.5$; $0.5 \geq m/(l + m + p) \geq 0.01$; $0.5 > p/(l + m + p) \geq 0$; and $1.1 \geq n/(m + p) \geq 0.9$.

The foregoing objects and other objects as well as specific method of producing aromatic polyester carbonate according to the present invention will become more apparent and understandable from the following detailed description thereof when read in connection with several preferred embodiments.

As is apparent from the foregoing general object of the present invention, oxybenzoyl copolyester carbonate according to the present invention consists essentially of the abovementioned four kinds of bonding units (a), (b), (c), and (d) which are joined together in the substantial form of the ester bonding (—COO—) or carbonate bonding $$-O-\underset{\underset{O}{\|}}{C}-O-$$

In this case, the bonding unit (d) may not necessarily be contained in the molecular structure. The ester bonding occurring in the bonding units (a), (b), and (c) is such one that occurs between the bonding units (a) per se as well as one that occurs between the bonding units (a) and (c), but no bonding unit (b) takes part in this ester bonding. On the other hand, the carbonate bonding occurring in these bonding units is one that occurs between the bonding units (a) and (b), between the bonding units (c) and (b), or among the bonding units (a), (b), and (c).

Accordingly, the radical

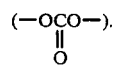

and the radical (—O—) appearing in the general formulas (a), (b), (c), and (d) are present in a substantially equal mol ratio. The abovedescribed equational relationship of $1.1 \geq n/(m + p) \geq 0.9$ represents such situation.

Also, a ratio of the number (l) of the p-hydroxybenzoyl bonding unit (a) occupying in the number of the bonding units (l + m + p) forming the entire ester bonding and carbonate bonding, i.e., l/(l + m + p), is represented by the following equation: 0.8 ≧ l/(l + m + p) ≧ 0.5 In the same manner, the ratio of the number (m) of the carbonate bonding unit (b) occupying in the number of the bonding unit (l + m + p) forming the entire ester bonding and carbonate bonding, i.e., m/(l + m + p), is represented by the following equation: 0.5 ≧ m/(l + m + p) ≧ 0.01. Outside the abovementioned equational relationship, that is, the polymer, a ratio of the p-hydroxybenzoyl bonding unit of which exceeds the upper limit (0.8) in the abovementioned equation, has a high flowing temperature, so that its shaping property is not satisfactory even at such a high temperature level as, for example, 400° C. Also, with the compound having a ratio of the p-hydroxybenzoyl bonding unit smaller than the lower limit (0.5) in the abovementioned equation, the physical properties of the shaped article, particularly, the Young's modulus and the mechanical strength, become lowered. Moreover, even when the ratio of the p-hydroxybenzoyl bonding unit satisfies the aforementioned equational relationship, if the polymer has a ratio of the carbonate bonding unit which is smaller than the lower limit (0.01) in the abovementioned equation, the flowing temperature of the polymer becomes relatively low, and its shaping property is generally improved. However, the physical property of the shaped article, particularly, the Young's modulus, becomes lowered, which is unfavorable for practical purposes. Furthermore, in the polymer which can satisfy the abovementioned equational relationship in respect of the ratio of the p-hydroxybenzoyl bonding unit, but which exceeds the upper limit (0.5) in the abovementioned equation in respect of the ratio of the carbonate bonding unit, there unavoidably exists such a disadvantage that the physical properties of the shaped article, particularly, the Young's modulus and mechanical strength thereof, are both poor.

Oxybenzoyl copolyester carbonate according to the present invention, which meets the afore-described conditions, also possesses an inherent viscosity of 0.5 and above as calculated by the following equation which is formulated by finding a relative viscosity on the basis of the under-defined conditions; that is, 50 mg of a test sample is dissolved in 10 ml of p-chlorophenol, and the relative viscosity of the prepared solution is measured by the use of an Ostwald's viscometer at a temperature of 50° C.

$$\eta_{inh} = \ln \eta_r/c$$

(where: $\eta_{inh}$, $\eta_r$, and $c$ represent, respectively, the inherent viscosity, the relative viscosity, and the concentration of the solution (g/dl)).

A polymer having the inherent viscosity of lower than 0.5 possesses a low melt-viscosity, which makes it difficult to exhibit sufficient mechanical strength as required when it is shaped into a shaped article.

Oxybenzoyl copolyester carbonate according to the present invention can be produced by several methods to be described hereinbelow. It is therefore possible that, by proper selection of the method of production, or by changing the ratio of the raw material to be used therefor, any one of the hydroxy group, carboxyl group, aryl ester group, and carbonate group be made to occupy the terminal group of the produced polymer at a predominant ratio. From the standpoint of readiness in production, it is preferable that the terminal group may consist principally of the aryl ester group.

Accordingly, a more preferable embodiment of oxybenzoyl copolyester carbonate according to the present invention is one in which the following relationship may be established among the abovementioned bonding units (a), (b), and (d).

0.75 ≧ l/(l + m + p) ≧ 0.6

0.4 ≧ m/(l + m + p) ≧ 0.05

0.35 ≧ p/(l + m + p) ≧ 0

As is apparent from the preceding equational relationship, the ratio of the number of p-hydroxybenzoyl bonding unit and the ratio of the number of the carbonate bonding unit occupying the number of the bonding units forming the entire ester bonding and the carbonate bonding are confined within the upper and the lower limits of the abovementioned equations, whereby the shaping property of the oxybenzoyl copolyester carbonate, and the Young's modulus of the shaped articles obtained from it may be brought to a desired state.

A more preferred embodiment of the present invention is such that, in the relationship of the abovementioned l, m, and p, the last parameter should be equal to zero (p = 0), in other words, the polymer does not substantially contain in it the aromatic dicarboxylic acid bonding unit (d).

As it will be apparent from the above, oxybenzoyl copolyester carbonate to be provided by the present invention has its structural characteristic in that it contains therein the carbonate bonding

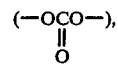

on account of which the shaping property of the oxybenzoyl copolyester carbonate and the Young's modulus of the shaped articles obtained from the polymer should be understood to exhibit excellent conditions.

Of various bonding units indicating the structure of oxybenzoyl copolyester carbonate according to the present invention, X designates the divalent aromatic hydrocarbon radicals which may be represented, for example, by the following formulas:

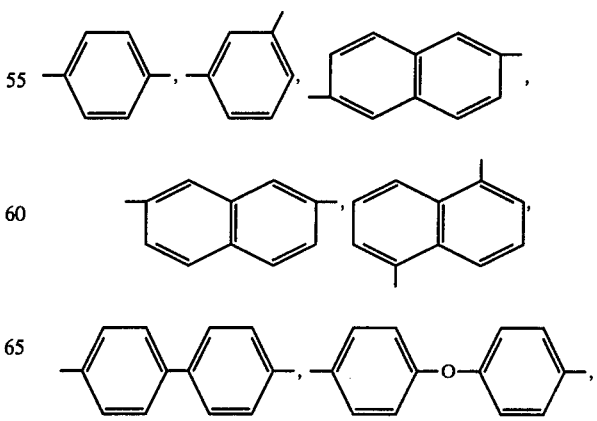

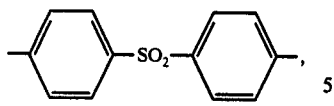

and so forth. Of these radicals as enumerated above, the phenylene group, that is, p-phenylene

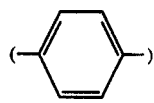

or m-phenylene

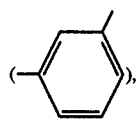

etc. are particularly preferable. As is evident from these examples, by divalent aromatic radicals to be used in the present invention are meant those having two bonds in the aromatic ring, in which those atoms other than carbon and hydrogen atoms may exist, depending on the circumstances.

Oxybenzoyl copolyester carbonate according to the present invention consists essentially of the bonding units (a), (b), and (c), with further addition of (d), depending on the case, as already mentioned in the foregoing. It should also be understood that the polymer may contain therein one or more of those bonding units corresponding to the abovementioned bonding units (a), (b), (c), or (d) substituted by the substituent group or groups selected from such groups as lower alkyl group as a represented by, for example, methyl, ethyl, propyl, and buthyl; halogen atoms as represented by, for example, chlorine, bromine, etc.; and lower alkoxy group as represented by, for example, methoxy, ethoxy, propoxy, butoxy, and so forth, at a ratio that does not substantially change the property of the oxybenzoyl copolyester carbonate which is the end product of the present invention.

Such oxybenzoyl copolyester carbonate according to the present invention is shaped into fiber and film forms having very favorable performance as will be disclosed at a later paragraph. Such favorable performance of the shaped article is considered due to the very strong anisotropic property which the polymer exhibits at the time of its melting — a property to cause polarized light to pass through mutually orthogonally intersected polarizers in an optical system, i.e., the property which the polymer molecules are oriented in a single definite direction.

Thus, the present invention also provides a very advantageous method for producing, in an industrialized scale, aromatic polyester carbonate as mentioned in the foregoing.

Such method of producing aromatic polyester carbonate according to the present invention can be achieved by polycondensation under heat of the following components:

p-hydroxybenzoic acids represented by the following general formula (1):

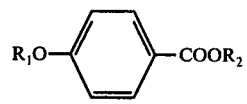 (1)

(where: $R_1$ is a hydrogen atom or a lower aliphatic alkanoyl group having 6 or less carbon atoms; and $R_2$ is a hydrogen atom or a monovalent aromatic hydrocarbon group having from 6 to 12 carbon atoms;

diaryl carbonates represented by the following general formula (2):

 (2)

(where: $R_3$ and $R_4$ are respectively monovalent aromatic hydrocarbon group having from 6 to 12 carbon atoms); and hydroquinones represented by the following general formula (3);

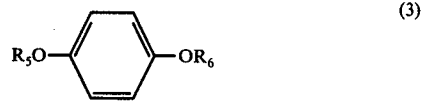 (3)

(where: $R_5$ and $R_6$ are respectively the same or mutually different, and consists of a hydrogen atom or a lower aliphatic alkanoyl group having 6 or less carbon atoms): or compounds represented by the above-described formulae (1), (2), (3) and aromatic dicarboxylic acids represented by the following general formula (4);

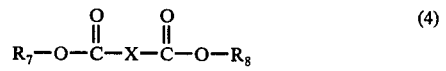 (4)

(where: $R_7$ and $R_8$ are respectively the same or mutually different, and consists of a hydrogen atom or a monovalent aromatic hydrocarbon group having from 6 to 12 carbon atoms; and X is a divalent aromatic group).

By the above-described method, there can be produced aromatic polyester carbonate having the aforementioned bonding units (a), (b), (c), and (d). The bonding unit (a) occurs from the compound represented by the above-described general formula (1); the bonding unit (b) occurs from the compound represented by the above-described general formula (2); the bonding unit (c) occurs from the compound represented by the above-described general formula (3); and the bonding unit (d) occurs from the compound represented by the above-described general formula (4).

p-hydroxybenzoic acids represented by the abovementioned general formula (1) contain a hydrogen atom or a lower aliphatic alkanoyl group having 6 or less carbon atoms as its constituent member $R_1$, and a hydrogen atom or a monovalent aromatic hydrocarbon group having from 6 to 12 carbon atoms as its constituent member $R_2$. For the monovalent aromatic hydrocarbon groups having from 6 to 12 carbon atoms to represent the constituent member $R_2$, there can be exemplified the following: phenyl, p-tolyl, p-ethylphenyl, p-isopropylphenyl, p-tertiarybutylphenyl, p-n-amylphenyl, p-isohexylphenyl, m-ethylphenyl, o-ethylphenyl, m-isopropylphenyl, α-naphthyl, β-naphthyl, and so forth. For the lower alkanoyl groups having 6 or less carbon atoms to represent the constituent member $R_1$, the following may be enumerated: formyl, acetyl, propionyl, butyryl, caproyl, and so on. Further, for the compounds represented by the above-described general formula (1), there can be enumerated the following: p-hydroxybenzoic acid, p-formyloxybenzoic acid, p-acetoxybenzoic acid, p-propionyloxybenzoic acid, phenyl p-hydroxybenzoate, tolyl p-hydroxybenzoate, β-naphthyl, p-hydroxybenzoate, phenyl p-acetoxybenzoate, tolyl p-acetoxybenzoate, and so forth.

Moreover, diaryl carbonates to be represented by the above general formula (2) are those having, as the aryl group, a monovalent aromatic hydrocarbon group with from 6 to 12 carbon atoms in each of the constituent members $R_3$ and $R_4$ independently. For the monovalent aromatic hydrocarbon group having from 6 to 12 carbon atoms, those which have been enumerated in the above-mentioned constituent member $R_2$ may be equally used. Examples of such diaryl carbonates are as follows: di-phenyl carbonate, di-tolyl carbonate, phenyl tolyl carbonate, dinaphthyl carbonate, and so forth.

Hydroquinones represented by the abovementioned general formula (3) are those being a hydrogen atom or a lower aliphatic alkanoyl group with 6 or less carbon atoms as its constituent members $R_5$ and $R_6$, both being composed of either the same or mutually different members. For the alkanoyl group, those which have been exemplified in the abovementioned constituent member $R_1$ may be equally used. Examples of such hydroquinones are as follows: hydroquinone, 1,4-diformyloxybenzene, 1,4-diacetoxybenzene, 1,4-dipropionyloxybenzene, and so on.

Furthermore, the aromatic dicarboxylic acids as represented by the abovementioned general formula (4) are those being a hydrogen atom or a monovalent aromatic hydrocarbon group with from 6 to 12 carbon atoms as its constituent members $R_7$ and $R_8$, both being composed of either the same or mutually different members, and divalent aromatic group as its constituent member X. For the monovalent aromatic hydrocarbon group having from 6 to 12 carbon atoms, those which have been enumerated in the abovementioned constituent member $R_2$ may be equally used. Examples of the divalent aromatic groups are as follows:

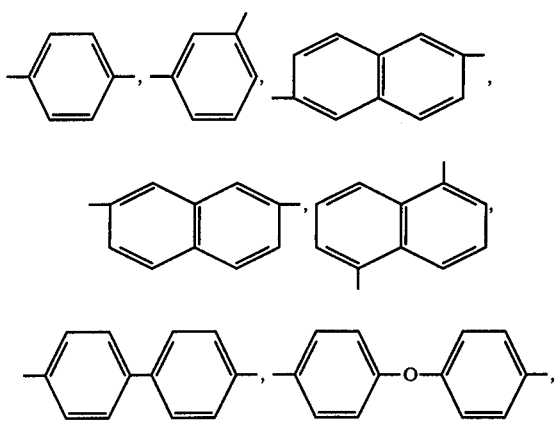

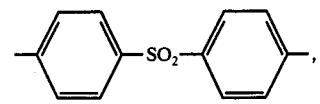

and so forth. For such aromatic dicarboxylic acids, there can be enumerated, for example: terephthalic acid, isophthalic acid, naphthalene-2,6-dicarboxylic acid, naphthalene-2,7-dicarboxylic acid, naphthalene-1,6-dicarboxylic acid, diphenyl-4,4'-dicarboxylic acid, diphenylether-4,4'-dicarboxylic acid, benzophenone-4,4'-dicarboxylic acid, diphenylsulfone-4,4'-dicarboxylic acid, diphenyl terephthalate ditolyl isophthalate, phenyl tolyl terephthalate, di-p-butylphenyl diphenylether-4,4'-dicarboxylate, and so forth.

Besides those compounds represented by the above-described general formulas (1), (2), (3), and (4), it is further possible, in the method of the present invention, to use one or more of those compounds corresponding to those represented by the above-described general formulas (1), (3), or (4) which have been substituted by the substituent group or groups selected from for example, lower alkyl groups like methyl, ethyl, propyl, and butyl; halogen atoms like chlorine and bromine; lower alkoxy groups like methoxy, ethoxy, propoxy, butoxy, and others, within such extent that does not change the essential properties of aromatic polyester carbonate as the aimed product.

For such substituted compounds, there can be enumerated, as examples, those nucleus-substituted aromatic compounds such as nucleus-substituted p-hydroxybenzoic acids as exemplified by the following: 3-chloro-4-hydroxybenzoic acid, 3-bromo-4-hydroxybenzoic acid, 3-methyl-4-hydroxybenzoic acid, 3-methoxy-4-hydroxybenzoic acid, 3,5-dichloro-4-hydroxybenzoic acid, 3,5-dibromo-4-hydroxybenzoic acid, 3-chloro-4-acetoxybenzoic acid, 3-methyl-4-acetoxybenzoic acid, 3-methoxy-4-propionyloxybenzoic acid, phenyl 3-methoxy-4-hydroxybenzoate, phenyl 3-chloro-4-acetoxybenzoate; nucleus-substituted hydroquinones as exemplified by the following: chloro hydroquinone, bromohydroquinone, methylhydroquinone, methoxyhydroquinone, ethoxyhydroquinone, 2-chloro-1,4-diacetoxybenzene, 2-bromo-1,4-dipropionyloxybenzene, 2-methyl-1,4-diacetoxybenzene; and nucleus-substituted aromatic dicarboxylic acids as exemplified by the following: 2-methylterephthalic acid, 4-methylisophthalic acid, 2-chloroterephthalic acid, and diphenyl 4-methylisophthalate.

In the method of the present invention, those compounds as represented by the afore-described general formulas (1), (2), and (3) as well as (4), depending on the case concerned, and, further, the nucleus-substituted aromatic compounds may be subjected to the polycondensation under heat either simultaneously or in an appropriate sequence as designated. The reaction is carried out under heat at an appropriate temperature level, and, if necessary, in the presence of a suitable catalyst.

The reaction temperature should usually be 180° C and above, or preferably 200° C and above, or more preferably 250° C and above, but, in any case, it should not exceed 350° C. Pressure for the reaction may be at any appropriate level that can expel various by-products such as, for example, carbon dioxide gas, phenol, water, and so forth out of the reaction system. The reaction may usually be conducted at a normal or a reduced pressure.

At the initial stage of the reaction, it is carried out under a normal pressure and at a relatively low temperature. As the reaction proceeds, the temperature level should preferably be raised, and the pressure be reduced.

Examples of the catalyst suitable for use in the reaction are: simple substances such as lithium, sodium, potassium, magnesium, calcium, and so on; or compounds of these simple substances and titanium, manganese, cobalt, zinc, tin, antimony, lanthanum, cerium, lead, germanium such as for example oxides, hydrides, hydroxides, halides, alcoholates, phenolates organic and inorganic acid salts, complex salts, mixed salts, and so forth. More concretely, there can be exemplified metal sodium, sodium hydroxide, lithium acetate, sodium acetate, potassium acetate, calcium benzoate, calcium acetate, magnesium acetate, titanium tetrabutoxide, titanium tetraphenoxide, manganese acetate, cobalt acetate, cobalt chloride, zinc oxide, stannous acetate, stannous benzoate, antimony trioxide, lanthanum hydroxide, cerium carbonate, lead oxide, germanium oxide, titanium trisacetyl acetonate, and so on. Of these compounds, the abovementioned stannous or tin compounds are particularly preferable.

The quantity of the catalyst to be used in carrying out the method of the present invention usually ranges from 0.005 to 1.0 mol % or preferably from 0.01 to 0.2 mol % with respect to the total acid compound (the total quantity of p-hydroxybenzoic acids and diaryl carbonates, or p-hydroxybenzoic acids, diaryl carbonates, and aromatic dicarboxylic acids, and nucleus-substituted aromatic compounds to be used depending on necessity) to be used at the time of producing aromatic polyester carbonate.

The charging ratio of the starting material may depend, to some extent, on the mode of the reaction. In general, however, the mol ratio of the bonding units (a), (c) and (d) in the aromatic polyester carbonate is substantially coincident with the charging ratio of the respective compounds which produce these bonding units, with the exception of the compound represented by the general formula (2) which produces the bonding unit (b). This is due to the fact that such compounds are not substantially removed by distillation out of the reaction system in the course of the reaction. On the other hand, the compound represented by the general formula (2) which produces the bonding unit (b), i.e.,

is decomposed during the reaction and tends to be removed from the reaction system by distillation in the form of carbon dioxide gas ($CO_2$). It is therefore recommended that, with a view to accelerating the reaction, this compound may be usually charged in more quantity than in its theoretical quantity.

In general, the charging quantity of diaryl carbonates to be used in carrying out the method of the present invention should be such that it satisfies the following equation (i). In other words, it has been found out that the quantity of diaryl carbonate to be used depends generally on the quantity of the desired carbonate bonding in the aromatic polyester carbmnate, and on the quantity of free carboxyl group which is present in p-hydroxybenzoic acids and aromatic carboxylic acids to be used simultaneously as the raw material, and that as the quantities of carbonate bonding and the free carboxyl group become increased, the quantity of diaryl carbonate to be used may be increased accordingly, for which purpose the quantity of diaryl carbonate may be made to satisfy empirically the following equation (i);

$$lr_1/100 + m + 2pr_2/100 \leq Z \leq 1.3\ lr_1/100 + 1.3m + 2.6pr_2/100 \qquad \text{(i)}$$

(where: Z is a charging quantity (in mol number) of diaryl carbonates; $l$, $m$, and $p$ indicate, respectively, the mol number of the desired bonding units (a), (b), and (c) contained in the aromatic polyester carbonate which is the aimed product; and $r_1$ and $r_2$ indicate, respectively, the quantity (in mol %) of the free carboxyl group present in p-hydroxybenzoic acids and aromatic dicarboxylic acids at the time of charging diaryl carbonate).

More preferably, the charging quantity of diaryl carbonates for use in carrying out the method of the present invention should satisfy the following equation (ii);

$$1.05\ lr_1/100 + 1.05m + 2.1\ pr_2/100 \leq Z \leq 1.2\ lr_1/100 + 1.2m + 2.4\ pr_2/100 \qquad \text{(ii)}$$

(where: Z is a charging quantity (in mol number) of diaryl carbonates; $l$, $m$, and $p$ indicate, respectively, the mol number of the desired bonding units (a), (b), and (c) contained in the aromatic polyester carbonate which is the aimed product; and $r_1$ and $r_2$ indicate, respectively, the quantity (in mol %) of the free carboxyl group present in p-hydroxybenzoic acids and aromatic dicarboxylic acids at the time of charging diaryl carbonates).

Thus, one of the preferred embodiments of the method for producing aromatic polyester carbonate according to the present invention uses, as the starting material, a compound to be represented by the following general formula (11) as p-hydroxybenzoic acids represented by the afore-described general formula (1):

(where: $R_2$ is a hydrogen atom or a monovalent aromatic hydrocarbon group having from 6 to 12 carbon atoms); and hydroquinone as hydroquinones represented by the afore-described general formula (3).

More specifically, the following three representative methods may be adopted selectively:

(I) a method, in which p-hydroxybenzoic acid, hydroquinone, and diaryl carbonate; or these three compounds and diaryl esters of the abovementioned aromatic dicarboxylic acid are subjected to polycondensation under heat in their molten state;

(II) a method, in which aryl ester of p-hydroxybenzoic acid, hydroquinone, and diaryl carbonate; or these three compounds and diaryl esters of the abovementioned aromatic dicarboxylic acid are subjected to polycondensation under heat in their molten state; and (III) a method, in which p-hydroxybenzoic acid and diaryl carbonate, or hydroquinone in addition to these two compounds are added to a reaction product resulting from direct esterification of the abovementioned aromatic dicarboxylic acid and hydroquinone, and the mixture is subjected to the polycondensation under heat in the molten state.

In the above-described mode of embodiments (I) and (II), it was found preferable that the charging ratio of diaryl carbonates may be such that the following equation (iii) is satisfied.

$$l + m + 2p \leq Z \leq 1.3 (l + m + 2p) \qquad (iii)$$

(where: Z is a charging quantity (in mol number) of diaryl carbonates; and $l$, $m$, and $p$ indicate, respectively, the mol number of the desired bonding units (a), (b), and (d) contained in aromatic polyester carbonate which is the aimed product of the present invention. By the way, it is stipulated that, in the compound as represented by the abovementioned general formula (1) to be used as the starting material to form the bonding unit (a), when p-hydroxybenzoic acids containing therein a monovalent aromatic hydrocarbon group having from 6 to 12 carbon atoms as its constituent member $R_2$ is used, the value of Z is calculated on the basis of $l = 0$, and, in the compound as represented by the abovementioned general formula (4) to be used as the starting material to form the bonding unit (d), when aromatic dicarboxylic acids containing therein a monovalent aromatic hydrocarbon group having from 6 to 12 carbon atoms as its constituent members $R_7$ and $R_8$ is used, the value of Z is calculated on the basis of $p = 0$.)

More preferably, diaryl carbonates may be used in the ratio to satisfy the following equation (iv):

$$1.05 (l + m + 2p) \leq Z \leq 1.1 (l + m + 2p) \qquad (iv)$$

(where: Z is a charging quantity (in mol number) of diaryl carbonates; and $l$, $m$, and $p$ indicate, respectively, the mol number of the desired bonding units (a), (b), and (d) contained in aromatic polyester carbonate which is the aimed product of the present invention.).

Still another preferred embodiment of the method of producing aromatic polyester carbonate according to the present invention is to use dialkanoyloxybenzene as hydroquinones as represented by the afore-described general formula (3), which is more specifically represented as follows:

(IV) a method, in which diaryl carbonate, or diaryl carbonate and diaryl esters of aromatic dicarboxylic acid is added to the reaction product resulted from reaction between p-hydroxybenzoic acid and 1,4-dialkanoyloxybenzene, and the mixture is subjected to the polycondensation under heat in the molten state.

The above-described methods of producing aromatic polyester carbonate according to the present invention are all related to those in which the reactants are subjected to the polycondensation under heat. According to the present invention, however, it has also been discovered that, in the practice of the above-described various methods, aromatic polyester carbonate of the exactly same quality as that mentioned in the foregoing which is the end product of the present invention can be produced by the polycondensation reaction even with the use of phosgene in place of diaryl carbonates as represented in the aforedescribed general formula (2). In this case, the reaction can be carried out preferably by means of the already known method, in which p-hydroxybenzoic acid, hydroquinone, and phosgene, or these three compounds and aromatic dicarboxylic acid, are subjected to the polycondensation in the presence of an alkaline solution.

Further, as the result of research and studies made by the present inventors, a preferable method for obtaining aromatic polyester carbonate having a relatively high inherent viscosity has been found according to which a polymer having an inherent viscosity of at least 0.3 is first produced, and then this polymer is subjected to the polycondensation under heat in solid phase until its inherent viscosity becomes as high as 0.1 and above.

Oxybenzoyl copolyester carbonate to be produced by the present invention exhibits an excellent shaping property by basically including therein the carbonate bonding, and, at the same time, it forms an anisotropic melt, on account of which a shaped article obtained by melt-forming of this polymer in such a form as, for example, fiber or film, in particular, possesses an increased molecular orientation due to its having been subjected to stretching by draft in the course of the melt-forming from its molten state to its solidified state, whereby the shaped article which exhibits the excellent Young's modulus or mechanical strength can be advantageously obtained.

In this way, the present invention also provides those shaped articles in fiber and film forms which are obtained by shaping oxybenzoyl copolyester carbonate containing therein the desired bonding units (a), (b), and (c) with further addition of (d) as the case may be, each of which is in the above-described equational relationship.

The characteristics of the fiber and film obtained in accordance with the present invention reside in that they exhibit a particularly excellent Young's modulus, owing to which those shaped articles may be advantageously utilized as the materials and supplies in those industrial fields where such high Young's modulus is especially required, as, for example, in the production of tire cords, electrically insulative materials, various other purposes.

The shaping process of oxybenzoyl copolyester carbonate according to the present invention consists of melt-shaping (spinning or film-forming) step and subsequent heat-treating step, as the case may be.

The melt-forming step is carried out by first heating to melt oxybenzoyl copolyester carbonate to be used to a temperature which is higher by 10° C and above, or more preferably by 15° to 40° C, than the flowing temperature of the polymer, and then forming the polymer material by extrusion method through an appropriate shaping nozzle.

The flowing temperature of oxybenzoyl copolyester carbonate according to the present invention depends, of course, upon its composition. However, its melt-forming temperature is usually within a range of from 250° to 380° C. It has been found out that oxybenzoyl copolyester carbonate, the melt-forming temperature of which is in a range of from 280° to 330° C, is satisfactory from the standpoint of the shaping operation, and also from the standpoint of the physical property of the resulted shaped article.

The anisotropic melt as extruded through the shaping nozzle is wound on a take-up reel after its solidification. Prior to the melt being turned from its molten state to its solidified state, however, the molten material is subjected to an appropriate stretching or elongation. This elongation at the time of the melt-forming is defined by the ratio between the speed of the shaped article (fiber or film) as measured at the time of the take-up operation and the speed of the melt passing through the shaping nozzle. With oxybenzoyl copolyester carbonate according to the present invention, this ratio is more than 5, or more preferably from 10 to 100, in the case of the fiber, and more than 1.1, or more preferably from 1.5 to 50 in the case of the film.

The elongation to be imparted to the polymer material at the time of the melt-forming gives an extremely important influence on the physical properties of the shaped articles to be resulted. Since the melt of the polymer material possesses the anisotropy, the elongation of the same at the time of its melt-forming, all the more, promotes the molecular orientation of oxybenzoyl copolyester carbonate, which imparts a favorable effect on the property of the resulted shaped article. In this consequence, the shaped article which is subjected to the elongation at the time of its melt-forming acquires a more favorable property than in the case of, for example, polyethylene terephthalate which does not form the anisotropic melt, so that there is no necessity for subsequent stretching of the shaped article as solidified. In other words, the shaped article as solidified is not always required to be re-stretched, but it has a satisfactory molecular orientation or crystallization attained therewithin by the stretch-orientation rendered at the time of the melt-forming.

The atmosphere, in which oxybenzoyl copolyester carbonate is extruded at the time of its melt-forming, may be conveniently air, and is not required to be particularly non-oxidizing. Also, the melt which has been extruded through the shaping had better be exposed, in some occasion, under an appropriate temperature condition before it is solidified and taken up on a reel. In the case of the fiber, there is adopted a method in which the temperature of the atmosphere within the spinning cylinder is often heated forcibly. In the case of the film, there is also adopted a method, in which the temperature of a drum, to which the melt is first contacted, is elevated, and, thereafter, depending on the case, the film is quenched.

Prior to the melt-forming operation, oxybenzoyl copolyester carbonate of the present invention should preferably be pulverized to an appropriate particle size, followed by sufficient drying, as has been well known in processing polyethylene terephthalate, and other polymers.

According to the research and studies made by the present inventors, it has been found that oxybenzoyl copolyester carbonate according to the present invention, in spite of its having the carbonate bonding, generates no gas which gives rise to difficulty in the shaping operation, or gives an undesirable effect on the shaped product due to its decomposition even at such temperature level as high as 300° C and above as mentioned in the foregoing, and that, in spite of the fact that it exhibits a relatively high degree of polymerization as signified by the inherent viscosity of 0.5 and above, when comparing the same with the afore-described known oxybenzoyl copolyester, and so on at a same temperature level, the polymer is generally low in its viscosity at the time of its melting, is satisfactory in its flowing property, and is excellent in its shaping property.

Accordingly, oxybenzoyl copolyester carbonate to be provided by the present invention exhibits a high degree of polymerization required of the shaped article per se, so that it is not always necessary to attempt to increase the degree of polymerization by the heat-treatment after the melt-forming as required in the case of the known type of oxybenzoyl copolyester, and improvement in its mechanical strength on the basis of the increased degree of polymerization. However, even in the case of the melt-forming operation using oxybenzoyl copolyester carbonate according to the present invention, it is preferable in some occasion to carry out the heat-treatment with a view to auxiliarily improving various performances of the resulted shaped article.

Generally speaking, the heat-treatment is conducted in a relaxed state. It has been found out that the shaped article of oxybenzoyl copolyester carbonate according to the present invention does not become essentially short in length even after it has undergone the heat-treatment, but it even elongates its length to some extent.

Although the preferred temperature for the heat-treatment depends on the composition of the oxybenzoyl copolyester carbonate, it is generally lower than the flowing temperature of the polymer, and, more specifically, a temperature range of from 200° to 380° is used. Such heat-treatment need not be maintained at a constant level, but it may be gradually elevated from a relatively low temperature level to a higher temperature level, as the case may be. It is also feasible that the temperature be stepwisely raised from a low temperature level to a higher temperature level. The time required for the heat-treatment extends from a few minutes to a few tens of hours, so that the atmosphere for conducting the heat-treatment should desirably be of a non-oxidizing nature such as, for example, a nitrogen current, and so forth. The heat-treatment may also be carried out under a reduced pressure.

Thus, the preferred mode of the fiber shaped article according to the present invention is such one that is formed from oxybenzoyl copolyester carbonate having the afore-described compositional ratio consisting of the bonding units (a), (b), and (c), with further addition of (d), depending on the case, the Young's modulus of which should be at least 2,000 kg/mm$^2$, or preferably, at least 2,500 kg/mm$^2$, and more preferably at least 3,000 kg/mm$^2$.

Further, a preferred mode of the film shaped article according to the present invention should have the Young's modulus of at least 800 kg/mm$^2$, or more preferably 1,000 kg/mm$^2$.

As stated in the foregoing, oxybenzoyl copolyester carbonate according to the present invention has an inherent viscosity of as high as 0.5 and above (or more preferably 1.0 and above), has a relatively high degree of polymerization (hence it has desirable properties to be primarily expected of the polymer material), and exhibits sufficiently favorable melt-forming property due to its relatively low viscosity at the time of the melt-forming, in spite of its high degree of polymerization, so that it provides the base material which is particularly suitable for use in various industrial fields where an especially high Young's modulus or a heat-resistant property are required.

Furthermore, the fiber and film formed from such oxybenzoyl copolyester carbonate are used as various sorts of industrial materials in the specific forms of shaped articles in the primary or secondary significance.

While aromatic polyester carbonate according to the present invention may be subjected to the melt-forming as it is, after its polymerization, its stability in the molten state can also be improved by addition of a conventionally known stabilizing agent. The stabilizers which may be used for such purpose are, for example, trivalent or pentavalent phosphorus compounds, and, more specifically, there are phosphorous acid, phosphoric acid, or alkyl or aryl esters of phosphorous acid and phosphoric acid such as trimethyl phosphate, triethyl phosphate, triphenyl phosphite, triphenyl phosphate, and so forth. These stabilizers may be added to the abovementioned polyester carbonate at any stage during a period of the polymerization of polyester carbonate upto completion of the shaping operation of the resulted polymer. Polyester carbonate according to the present invention can also be added with conventionally known additives such as, for example, an agent for making the material difficult to burn, flattening agent, and so on.

With a view to enabling those persons skilled in the art to put the present invention as so far been described generally and specifically into practice, several preferred examples are presented hereinbelow. It should, however, be noted that these examples are merely illustrative of the present invention and not so restrictive, and that any changes and modifications in the components for the aromatic copolyester carbonate may be made by those skilled in this field of art without departing from the spirit and scope of the present invention as set forth in the appended claims.

Before presenting the preferred examples of the present invention, various methods of measurements employed for testing the properties of the polymer obtained in accordance with the present invention will be defined as follows:

(1) Young's modulus, tenacity, and elongation

A tensile test is performed by the use of a sample filament for measurement having a specimen length (a chuck distance) of 5 cm, and a sample film for measurement having a dimension of 2 cm in length and 0.5 cm in width at a tensile speed of 100 %/min.

The rupture tenacity is denoted in terms of a value of the test sample, prior to its being subjected to the tensile test, with respect to a denier or a cross-section (mm$^2$) of the sample filament or the film, and the rupture elongation is denoted in terms of a ratio (%) of the length of the test sample prior to its tensile test with respect to a length thereof after the elongation (a length of the sample at the time of its rupture subtracted by a length of the sample prior to its rupture elongation test). Also, the Young's modulus of elasticity is calculated from a rising portion of an elongation curve of the polymer material, the unit of measurement of which is the same as that of the rupture strength.

(2) Melt viscosity

A test sample is placed in a flow tester heated to a prescribed temperature and provided with a shaping nozzle having a hole of 0.5 mm in diameter and 4 mm in length. Then, the test sample is extruded through the shaping nozzle under a pressure of 50 kg/cm$^2$ or 300 kg/cm$^2$, in the course of which the flowing speed of the polymer (cc/min) is measured, and the melt viscosity (poise) is calculated by the use of a well known equation.

(3) Flowing temperature

A test sample is placed in a flow tester provided with a shaping nozzle having a hole of 0.5 mm in diameter and 4 mm in length. Then, a pressure of 100 kg/cm$^2$ is applied to the test specimen. In this state, the temperature is caused to increase from room temperature at a rate of rise of 5° C/min. The temperature level at which the test sample begins to flow out through the hole of the shaping nozzle is made the flowing temperature (° C) of the sample polymer.

(4) Decomposition starting temperature

Approximately 10 mg of a sample polymer is placed in a differential thermal analyzer, and the temperature thereof is raised at a rate of rise of 10° C/min. in a nitrogen current. The temperature, at which the weight of the sample polymer begins to reduce, is made the decomposition starting temperature (° C) of the sample polymer.

(5) Analyses of the polymer composition

The composition of the polymer is denoted by the following equations.

Content (%) of the bonding unit (a) = $l/(l+m+p) \times 100$

Content (%) of the bonding unit (b) = $m/(l+m+p) \times 100$

Content (%) of the bonding unit (c) = $n/(l+m+p) \times 100$

Content (%) of the bonding unit (d) = $p/(l+m+p) \times 100$ (where: $l$, $m$, $n$, and $p$ denote, respectively, the mol number of the abovementioned bonding units (a), (b), (c), and (d) present in the polymer.)

In the present invention, the mol number of the abovementioned bonding units (a), (c) and (d) in the polymer, i.e., $l$, $n$, and $p$, determined by decomposing the polymer in methyl alcohol, and by finding the mol number of the constituent members

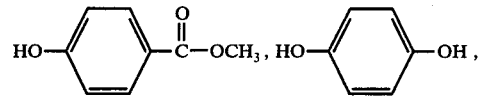

and

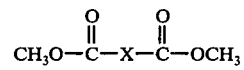

in the decomposed products by means of gas chromatography. Also, the mol number $m$ of the bonding unit (b) in the polymer is determined by first hydrolyzing the polymer with an excess of alcoholic caustic soda, then titrating the hydrolyzed product with sulfuric acid, on the basis of which a titration curve is drawn to find out the value of $(l + m + 2p)$ from the titration quantity at a point of inflection in the vicinity of a pH value of approximately 7. Thereafter, the final mol number of the bonding unit (b) is calculated by the use of the abovementioned value of $(l + m + 2p)$, and the values of $l$ and $p$ which have been found out previously by the gas chromatography. Incidentally, at the point of inflection in the vicinity of the pH value of approximately 7, Na$_2$CO$_3$ produced from the abovementioned hydrolysis is verified by a separate test method to have been turned into NaHCO$_3$.

EXAMPLES 1 AND 2

Prescribed amounts of p-hydroxybenzoic acid, hydroquinone, and di-phenyl carbonate with further addition of 0.07 part weight of stannous acetate were charged in a polymerization vessel having an agitator and inlet and outlet ports for nitrogen gas. After the reaction system was sufficiently substituted with nitrogen gas, it was heated to a temperature of 250° C, while causing nitrogen gas to flow slowly in the system. After lapse of about 60 minutes, the reaction temperature was raised to 280° C, and the pressure in the reaction system was gradually reduced to about 0.5 mm Hg in a period of about 30 minutes, thereafter the reaction was further continued for 60 minutes.

A polymer (having an inherent viscosity of about 0.8) obtained from the above reaction was pulverized, which was then subjected to a further polymerization in solid phase for about 300 minutes at a temperature of 260° C under a reduced pressure of 0.5 mm Hg, whereby polyester carbonate having a high degree of polymerization was obtained.

One hundred parts by weight of the thus obtained polymer of high degree of polymerization was desiccated for four hours at a temperature of 160° C, after which it was mixed with 0.08 part by weight of triphenyl phosphate. The mixture was then melt-extruded through a shaping nozzle having a single tiny passagehole of 0.3 mm in diameter, and wound on a take-up reel. The charging quantities of the raw materials, the composition and physical properties of the resultant polymer, and the spinning conditions of the polymer as well as the performance of the shaped article are shown in Tables 1 and 2 below.

EXAMPLES 3 TO 5

The prescribed amounts of phenyl p-hydroxybenzoate, diphenyl isophthalate, hydroquinone, and di-phenyl carbonate, as shown in Table 1, with further addition of 0.07 part by weight of stannous acetate were charged in the reaction vessel same as that used in Example 1 above. After the reaction system was sufficiently substituted with nitrogen gas, the system was heated for 60 minutes at a temperature of 280° C, while causing nitrogen gas to flow gradually therewithin. Further, the pressure within the reaction system was gradually reduced to about 0.5 mm Hg in a time period of 30 minutes, after which the reaction was further continued for 20 minutes.

A polymer (having an inherent viscosity of about 0.4) obtained from the abovementioned reaction was pulverized, which was then subjected to a further polymerization in solid phase for about 300 minutes at a temperature range of from 250° to 270° C under a reduced pressure of 0.5 mm Hg, whereby polyester carbonate having a high degree of polymerization was obtained.

After the polymer of a high degree of polymerization was dried, it was melt-extruded through a shaping nozzle having a single tiny hole of 0.3 mm in diameter, and wound on a take-up reel. The charging quantities of the raw materials, the composition and physical properties of the resultant polymer, the spinning conditions of the polymer, and the performance of the shaped article are shown in Tables 1 and 2.

EXAMPLE 6

The prescribed amounts of p-hydroxybenzoic acid, hydroquinone, and di-phenyl carbonate as shown in Table 1 below, with further addition of 0.35 part by weight of stannous acetate were charged in a reaction vessel same as that used in Example 1 above. After the reaction system was sufficiently substituted with nitrogen gas, the system was heated to 250° C, while causing nitrogen gas to flow slowly therewithin. After lapse of approximately 90 minutes, the reaction temperature was raised to 280° C, and the pressure in the reaction system was gradually reduced to approximately 0.5 mm Hg in a time period of about 45 minutes, thereafter the reaction was further continued for 30 minutes. The inherent viscosity of the polymer from the above reaction was 0.32. The thus obtained polymer was pulverized, and subjected to a further polymerization in solid phase for 300 minutes at a temperature of 260° C under a reduced pressure of 0.3 mm Hg, thereby obtaining polyester carbonate of a high degree of polymerization.

After this polyester carbonate of high degree of polymerization was dried, it was melted at a temperature of 280° C and then extruded from a T-shaped die having a slit of 0.3 mm in width onto a drum heated to 100° C and rotating at a speed of 10 m/min., whereby a film having a thickness of approximately 100 microns was obtained. The forming conditions and test results are as shown in Tables 1 and 2 below.

Also, the film obtained in the above manner was further heat-treated for 360 minutes at a temperature of 280° C under a reduced pressure of 0.5 mm Hg, whereupon the Young's modulus, mechanical strength, and elongation of the film after the heat-treatment was improved to 1,100 kg/mm$^2$, 45.2 kg/mm$^2$, and 3%, respectively.

EXAMPLE 7

The prescribed amounts of p-hydroxybenzoic acid, diphenyl isophthalate, hydroquinone, and di-phenyl carbonate as shown in Table 1 below with further addition of 0.35 part by weight of stannous acetate were charged into a reaction vessel same as that used in Example 1 above, and the batch was heated to 250° C, while causing nitrogen gas to flow slowly. After lapse of 60 minutes, the reaction temperature was raised to 280° C, and the pressure within the reaction system was gradually reduced to 0.5 mm Hg in a time period of about 60 minutes, thereafter the reaction was further continued for 10 minutes. A polymer obtained from the abovementioned reaction was pulverized and subjected to a further polymerization in solid phase for 300 minutes at a temperature of 260° C under a reduced pressure of 0.5 mm Hg, whereby polyester carbonate having a high degree of polymerization was obtained.

The thus obtained polymer was dried sufficiently, after which it was formed into a film in the same manner as described in Example 6 above, with the exception that the melting temperature thereof was changed to 335° C. The conditions and test results conducted on this film are as shown in Tables 1 and 2 below.

The film obtained in the above-described manner was further heat-treated under a reduced pressure of 0.5 mm Hg in the same manner as in Example 6. The Young's modulus, mechanical strength, and elongation of the film after the heat-treatment were improved to 1,200 kg/mm$^2$, 42.5 kg/mm$^2$, and 2%, respectively.

EXAMPLE 8

The prescribed amounts of phenyl p-hydroxybenzoate, diphenyl isophthalate, hydroquinone, and di-phenyl carbonate as shown in Table 1 below with further addition of 0.07 part by weight of stannous acetate were charged in a polymerization vessel. The polymerization reaction was conducted in exactly the same manner as in Examples 3 to 5 above, with the exception that the time required for the solid phase polymerization was made 540 minutes, whereby polyester carbonate having a high degree of polymerization was obtained.

One hundred and thirty parts by weight of the thus obtained polymer was dried, after which it was melted together with 0.08 part by weight of triphenyl phosphite, and then extruded from a shaping nozzle having a single tiny hole of 0.3 mm in diameter, followed by winding on a take-up reel.

The spinning conditions and the test results conducted on the sample fiber are as shown in Tables 1 and 2 below.

Comparative Examples 1 and 2

Phenyl p-hydroxybenzoate, diphenyl isophthalate, hydroquinone, and stannous acetate, were charged into a reaction vessel in quantities same as those used in Example 1 above, and the whole batch was heated for 60 minutes at a temperature of 280° C in a nitrogen gas current, after which the pressure in the reaction system was gradually reduced to approximately 0.5 mm Hg in a time period of 30 minutes, and thereafter the polymerization was further conducted for 20 minutes.

A polymer (having an inherent viscosity of about 0.4) obtained from the abovementioned reaction was pulverized, and subjected to a further polymerization in solid phase for 540 minutes at a temperature of 270° C under a reduced pressure of 0.5 mm Hg, whereby polyester carbonate of high degree of polymerization was obtained. This polyester carbonate was made the polymer for Comparative Example 1.

Another polymer for the Comparative Example 2 was produced in the same manner as in the above Comparative Example 1, with the exception that the time required for the solid phase polymerization was made 300 minutes.

These two kinds of polyesters having a high degree of polymerization were dried, after which they were melted, extruded from a shaping nozzle having a single tiny hole of 0.3 mm in diameter, and wound on a take-up reel. The charging quantities of the raw materials, the composition and physical properties of the polymer, and the spinning conditions of the polymer, as well as the performance of the shaped articles obtained from the polymer material are shown in Tables 1 and 2 below.

TABLE 1

| | RAW MATERIALS CHARGED (Numerical figures indicate the quantities used in wt. part) | | | |
|---|---|---|---|---|
| | p-hydroxy-benzoic acids | diaryl carbonates | hydroquinones | aromatic dicarboxylic acids |
| Example 1 | p-hydroxybenzoic acid 96.6 | diphenyl carbonate 224.7 | hydroquinone 33.0 | — |
| Example 2 | p-hydroxybenzoic acid 82.8 | diphenyl carbonate 224.7 | hydroquinone 44.0 | — |
| Example 3 | phenyl p-hydroxybenzoate 149.8 | diphenyl carbonate 23.54 | hydroquinone 33.0 | diphenyl isophthalate 63.6 |
| Example 4 | phenyl p-hydroxybenzoate 149.8 | diphenyl carbonate 47.1 | hydroquinone 33.0 | diphenyl isophthalate 31.8 |
| Example 5 | phenyl p-hydroxybenzoate 139.1 | diphenyl carbonate 56.2 | hydroquinone 38.5 | diphenyl isophthalate 31.8 |
| Example 6 | p-hydroxybenzoic acid 483.0 | diphenyl carbonate 1123.5 | hydroquinone 165.0 | — |
| Example 7 | p-hydroxybenzoic acid 483.0 | diphenyl carbonate 898.8 | hydroquinone 165.0 | diphenyl isophthalate 318.0 |
| Example 8 | phenyl p-hydroxybenzoate 139.1 | diphenyl carbonate 23.5 | hydroquinone 38.5 | diphenyl isophthalate 79.5 |
| Control 1 | phenyl p-hydroxybenzoate 149.8 | — | hydroquinone 33.0 | diphenyl isophthalate 95.4 |
| Control 2 | phenyl p-hydroxybenzoate 128.4 | — | hydroquinone 44.0 | diphenyl isophthalate 127.2 |

| | | | | POLYMER | | | |
|---|---|---|---|---|---|---|---|
| Bonding Unit (mol %) | | | | Inherent viscosity | Flowing temperature | Melt viscosity | Decomposition start. temp. |
| (a) | (b) | (c) | (d) | (dl/g) | (° C) | (poise) | (° C) |
| 69 | 31 | 30 | — | 1.20 | 270 | at 300° C 250 | 360 |
| 60 | 40 | 39 | — | 1.21 | 280 | at 310° C 290 | 350 |
| 68 | 11 | 32 | 21 | 1.25 | 300 | at 330° C 380 | 360 |
| 68 | 21 | 32 | 11 | 1.18 | 270 | at 330° C 340 | — |
| 64 | 25 | 36 | 11 | 1.28 | 265 | at 295° C 320 | — |
| 68 | 32 | 32 | — | 1.29 | 270 | at 290° C 300 | 370 |
| 68 | 11 | 33 | 21 | 1.38 | 300 | at 335° C 420 | — |
| 64 | 10 | 35 | 26 | 2.05 | 300 | at 330° C 9000 | — |
| 67 | — | 32 | 33 | 2.05 | 350 | at 390° C 11000 | — |
| 58 | — | 41 | 42 | 1.23 | 320 | at 360° C 800 | — |

TABLE 2

| | Shaping Conditions | | | Heat-Treatment Conditions | | |
|---|---|---|---|---|---|---|
| | Configuration | Forming temp. (° C) | Winding speed (m/min.) | Temp. (° C) | Pressure (mm Hg) | Time (min.) |
| Ex. 1 | fiber | 300 | 100 | — | — | — |
| Ex. 2 | " | 310 | 100 | — | — | — |
| Ex. 3 | " | 330 | 100 | — | — | — |
| Ex. 4 | " | 300 | 100 | — | — | — |
| Ex. 5 | " | 295 | 100 | — | — | — |
| Ex. 6 | film | 290 | 10 | 280 | 0.5 | 360 |
| Ex. 7 | " | 335 | 10 | 280 | 0.5 | 360 |
| Ex. 8 | fiber | 330 | 50 | — | — | — |
| Control 1 | " | 390 | 30 | — | — | — |
| Control 2 | " | 360 | 36 | — | — | — |

| Physical Properties of Shaped Article Prior to Heat-Treatment | | | | |
|---|---|---|---|---|
| Fiber denier (de) | Film thickness (mm) | Young's modulus (kg/mm²) | Strength (g/de) | Elongation (%) |
| 20 | — | 4300 | 6.2 | 2 |
| 20 | — | 3200 | 6.0 | 2 |
| 20 | — | 4300 | 6.5 | 2 |
| 20 | — | 4200 | 6.8 | 2 |
| 20 | — | 2800 | 6.5 | 2 |
| — | 0.1 | 882 | 36.1 (kg/mm²) | 2 |
| — | 0.1 | 900 | 32.5 (kg/mm²) | 2 |
| 50 | — | 3780 | 10.2 | 3 |
| 130 | — | 2300 | 4.3 | 2 |
| 40 | — | 1900 | 4.9 | 3 |

Example 9

64.5 parts by weight of diphenylether-4,4'-dicarboxylic acid and 55.0 parts by weight of hydroquinone were subjected to direct esterification reaction in the presence of 0.07 parts by weight of stannous acetate for 6 hours at a temperature of 300° C under normal pressure in a nitrogen current.

To the thus obtained esterified product, there was added 75.9 parts by weight of p-hydroxybenzoic acid and 119.6 parts by weight of ditolyl carbonate, and the batch was heated in a nitrogen current for 1 hour at a temperature of 250° C. Further, the reaction temperature was changed to 320° C, and, at the same time, the pressure in the reaction system was gradually reduced to 0.5 mm Hg in a time period of approximately 60 minutes, thereafter the reaction was further continued. A polymer produced by the abovementioned process had an inherent viscosity of 1.05.

The polymer was composed of 53 mol % of p-hydroxybenzoic acid component (bonding unit (a)), 20 mol % of carbonate component (bonding unit (b)), 48 mol % of hydroquinone component (bonding unit (c)), and 27 mol % of diphenylether-4,4'-dicarboxylic acid component (bonding unit (d)), respectively.

The thus obtained polymer was pulverized and dried, after which it was subjected to melt-spinning in the same manner as in Example 1 above. Fibers exhibiting favorable performance could be obtained without any difficulty whatsoever.

Example 10

102.1 parts by weight of p-hydroxybenzoic acid, 58.2 parts by weight of 1,4-diacetoxybenzene, and 0.10 part by weight of lead oxide were heated in a HCl gas current for 8 hours at a temperature of 200° C and under normal pressure.

To this reaction product, there were added 107.6 parts by weight of di-(p-tert-butylphenyl) carbonate, and 33.2 parts by weight of diphenyl 5-methyl-isophthalate. Then, the batch was subjected to a further melt polymerization and a solid phase polymerization in the same manner as in Example 9 above. As the result of these polymerization reactions, there was obtained a polymer having an inherent viscosity of 0.80, and composed of 72 mol % of p-hydroxybenzoic acid component (bonding unit (a)), 16 mol % of carbonate component (bonding unit (b)), 27 mol % of hydroquinone component (bonding unit (c)), and 12 mol % of 5-methyl-isophthalic acid component (bonding unit (d)), respectively.

What is claimed is:

1. Aromatic polyester carbonate in a substantially linear structure having an inherent viscosity of 0.5 and above, and consisting essentially of bonding units to be represented by the following general formulas:

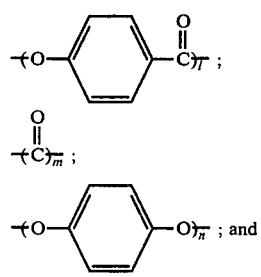

-continued

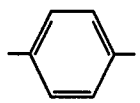 (d)

where: X is a divalent aromatic group; the group

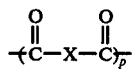

and —X— in said general formulas (a), (c), and (d) are substantially bonded together by the ester bonding and the carbonate bonding; and said bonding units are mutually bonded under the following equational relationship:

$$0.75 \geq l/(l + m + p) \geq 0.6;$$

$$0.4 \geq m/(l + m + p) \geq 0.05;$$

$$0.35 \geq p/(l + m + p) \geq 0;$$

and $$1.1 \geq n/(m + p) \geq 0.9.$$

2. Aromatic polyester carbonate as set forth in claim 1, in which $p$ is zero.

3. Aromatic polyester carbonate as set forth in claim 1, in which X is the phenylene group.

4. A fiber of aromatic polyester carbonate of claim 1.

5. The fiber of aromatic polyester carbonate as set forth in claim 4, in which the Young's modulus is at least 2,000 kg/mm².

6. The fiber of aromatic polyester carbonate as set forth in claim 4, in which the Young's modulus is at least 3,000 kg/mm².

7. A film of aromatic polyester carbonate of claim 1.

8. The film of aromatic polyester carbonate as set forth in claim 7, in which the Young's modulus is at least 800 kg/mm².

9. The film of aromatic polyester carbonate as set forth in claim 7, in which the Young's modulus is at least 1,000 kg/mm².

10. Aromatic polyester carbonate as set forth in claim 1, formed from p-hydroxybenzoic acid, hydroquinone and di-phenylcarbonate.

11. Aromatic polyester carbonate as set forth in claim 1, formed from phenyl-p-hydroxy benzoate, di-phenyl isophthalate, hydroquinone and di-phenylcarbonate.

12. Aromatic polyester carbonate as set forth in claim 1, formed from p-hydroxybenzoic acid, di-phenyl isophthalate, hydroquinone and di-phenylcarbonate.

13. Aromatic polyester carbonate as set forth in claim 1, formed from di-phenylether-4,4'-di-carboxylic acid, hydroquinone, p-hydroxybenzoic acid and di-tolylcarbonate.

14. Aromatic polyester carbonate as set forth in claim 1, formed from p-hydroxybenzoic acid, 1,4-di-acetoxybenzene, di-(p-tert-butylphenyl) carbonate and di-phenyl-5-methylisophthalate.

* * * * *